United States Patent Office

3,400,093
Patented Sept. 3, 1968

3,400,093
PROCESS FOR PREPARING A STABLE POLYMER LATEX CONTAINING AN INSECTICIDE
Irving Feinberg, 107 E. Crystal View Drive, Sanford, Fla. 32771
No Drawing. Continuation-in-part of application Ser. No. 386,066, July 29, 1964. This application Mar. 11, 1966, Ser. No. 533,417
12 Claims. (Cl. 260—29.6)

This application is a continuation-in-part of my copending application Ser. No. 386,066, filed July 29, 1964, now abandoned, and of my copending application Ser. No. 329,903, filed Dec. 11, 1963, now abandoned, the latter being a continuation-in-part of the subject matter disclosed in my then copending application Ser. No. 152,036, filed Nov. 13, 1961, now abandoned, and of the subject matter disclosed in my then copending application Ser. No. 152,037, filed Nov. 13, 1961, now United States Patent No. 3,156,661.

This invention relates to insecticide-containing polymers and polymer latexes, to processes for making such polymers and latexes and to coating compositions made therefrom. More particularly, this invention relates to the incorporation of water-insoluble insecticides in such polymers and latexes.

In many parts of the world, the occurrence of surface crawling insects, for instance, roaches, in buildings poses a substantial health problem to people, to say nothing of the psychological distress caused by such insects. One means of combating such insects in buildings is to incorporate insecticides into surface coatings, such as the floor polishes described in my U.S. Patents Nos. 3,008,871 and 3,156,661. Characteristically, the effective insecticides are organic compounds that are substantially insoluble in water.

Unfortunately, known methods for incorporating insecticides into water-based surface coating compositions in a manner such that the insecticide remains uniformly dispersed in the aqueous composition without settling out and in a sufficient amount to be insecticidally active, both initially and for extended periods of time, have been somewhat unsatisfactory. This is especially true in respect of aqueous polymer latexes that are major constituents of dry-bright floor polishes and water-base paints, because most effective insecticides are substantially insoluble in water, they do not remain dispersed in the aqueous phase of such latexes, but instead tend to settle out as sludge or sediment, and they have a low equilibrium solubility in melted polymers of the kind used in latexes. Furthermore, there is neither any method by which the polymer phase of a polymer latex may be separately melted in order to dissolve some insecticide, albeit only a little, into the polymer without breaking (and thus destroying) the latex emulsion, nor any method of reconstituting, and obtaining acceptable characteristics, a once-broken latex emulsion. The only acceptable means for forming a polymer latex emulsion for use in floor polishes and paints is by the initial step of emulsion polymerization.

Accordingly, one object of the invention is to provide a new, useful and relatively simple process for incorporating water-insoluble insecticides in polymers made from vinyl-type monomers.

Another object of the invention is to provide an improved polymerization process whereby polymers and particularly polymer latexes are made by polymerizing vinyl-type monomers having dissolved therein an insecticide, thereby providing a means for making an insecticide-containing polymer latex emulsion in which the insecticide content remains stable and does not settle out.

An additional object is to provide insecticide-containing polymer latexes useful in formulating water-based coating compositions, especially paints, and the paints made from such polymer latexes.

Yet another object is to provide water-based paint compositions in which an insecticide is incorporated into the polymeric phase and from which insecticidally active paint films may be obtained.

A further object of the invention is to provide polymer latexes which contain an insecticide in the dispersed polymer phase and which can be directly used in preparing water-base coating compositions by simple admixing procedures.

Another objective of the invention is to provide a method by which such insecticides as lindane and dieldrin may be incorporated in latex polymers of the water-insoluble thermoplastic acrylic and/or styrene types by which method it is possible to prepare hard resinous vinyl polymeric materials that contain the insecticides in greater quantities than possibly attainable by the more direct methods of incorporation shown in my U.S. Patent No. 3,156,661.

I have discovered that water-insoluble organic insecticides which are soluble in liquid polymerizable materials used in emulsion polymerization procedures not only fail to inhibit the polymerization reaction, as is characteristic of some other types of biologically active substances, but that the polymerization procedure can be carried out in the usual way and secure a latex polymer containing the insecticide in an amount which is only limited by the solubility characteristic of the liquid polymerizable material for the insecticide involved and without adverse effects on other characteristics of the dispersed polymer latex.

Broadly stated, my invention encompasses processes for making an insecticide-containing polymer from one or more polymerizable vinyl-type monomers using emulsion polymerization techniques in a medium in which the insecticide is substantially insoluble and in which an organic insecticide is dissolved in at least one of the monomers during the polymerization thereof.

In a narrower aspect, my invention encompasses processes for making an insecticide-containing polymer latex by dissolving at least one substantially water insoluble organic insecticide in one or more polymerizable vinyl-type monomers, dispersing such monomer as droplets throughout an aqueous polymerization medium and polymerizing the monomer by emulsion polymerization techniques to discrete normally solid small insecticide-containing polymer particles dispersed throughout the polymer latex emulsion. Suitable vinyl-type monomers include, illustratively, acrylic acids, the aryl and alkyl esters of acrylic acids, the lower alkenyl esters of saturated carboxylic acids, and lower alkyl esters of unsaturated carboxylic acids, mono- and dialkenyl benzenes, mono- and diolefins and mixtures thereof. Suitable insecticides are characteristically water-insoluble but otherwise encompass a broad spectrum of chemical structures, although chlorinated hydrocarbons and organic phosphate derivatives are especially suitable. Illustrative insecticides are enumerated in Table I hereof.

In a still further aspect, my invention includes the stable aqueous polymer latex emulsions made in accordance with the foregoing, and the water based coating compositions, particularly paints and floor polishes, usefully made from such insecticide-containing polymer latexes.

My invention is particularly unexpected in view of previously known difficulties in conducting polymerizations and the widely held views of those skilled in the polymerization art regarding inhibitors of polymerization reactions. The invention has the additional advantage that it permits the incorporation of toxic insecticides into a polymer and into coating compositions by a method which minimizes the handling of the insecticides by workmen.

Various organic substances, including some that are biologically active, are known to inhibit polymerization reactions, and in view of the sensitivity of polymerizable materials to inhibitors, and other difficulties encountered in emulsion polymerization procedures, including those of securing suitable particle sizes in the synthetic polymeric products, there has been a general avoidance of any methods for incorporating organic insecticides in synthetic latex polymers which involve contaminating the environment for the polymerizable material during the polymerization reaction. It has been thought that insecticides would adversely influence and inhibit the polymerization reactions, or otherwise adversely affect the resulting product, such as by increasing the particle size or adversely influencing the molecular weights, physical properties or shelf-life stability of the resulting products, and/or that the insecticidal activity of the insecticide would be adversely affected.

In carrying into practice the process of incorporating the insecticidal material into the synthetic latex polymer, a homogeneous liquid mixture of the liquid polymerizable material and the selected insecticide normally is formed and emulsified in a suitable, generally aqueous, medium for the emulsion polymerization reaction. The polymerization of the polymerizable component of the liquid mixture then is carried out by conventional procedures in the presence of a catalyst appropriately selected for use with the polymerizable material. The homogeneous mixture of the insecticide and liquid polymerizable material can be formed by simply dissolving the insecticide in the liquid polymerizable material, as by intimately mixing the insecticide and polymerizable material together by simple stirring procedures. This is preferably accomplished independently of the aqueous medium utilized in the polymerization reaction and in which the mixture is emulsified, and the emulsification of the mixture accomplished thereafter. However, the dissolution of the insecticide in the polymerizable material also may be accomplished by simply stirring the polymerizable material and insecticide together in the aqueous medium until sufficient contact between the components is effected to cause the insecticide to go into solution with the polymerizable material and thereby to form the homogeneous liquid mixture.

The liquid mixture, including the polymerizable component, is emulsified in the aqueous reaction medium by conventional procedures. This may be accomplished by adding the independently formed mixture to the medium with rapid stirring in the presence of suitable dispersing or emulsifying agents that may be incorporated in the aqueous medium to aid in the formation of the emulsion. The dispersing agent may be added to the aqueous medium before or simultaneously with the addition of the liquid mixture containing the polymerizable component, and, of course, more than one dispersing or emulsifying agent may be added. All of the liquid mixture containing the polymerizable component may be added initially to the aqueous medium or a portion may be added after polymerization reaction has been initiated, as when the delayed addition technique, well known in the art, is utilized.

Polymerization of the polymerizable component is carried out under conventional emulsion polymerization conditions for polymerizing the liquid polymerizable material involved and in the presence of a suitable catalyst for initiating the particular polymerization reaction. This can be accomplished by initially dissolving the catalyst in the aqueous medium before or after the liquid mixture is emulsified therein and by bringing the aqueous reaction mixture to a suitable temperature for the reaction to proceed. In many cases, these reactions are exothermic, and under such circumstances, the vessel containing the reaction material may be provided with a suitable jacket to enable circulation of a suitable fluid cooling medium in indirect heat exchange with the materials contained in the vessel so as to effect control of the reaction temperature.

It is preferable, when the homogeneous liquid mixture is formed in the aqueous medium, to do this in the absence of the catalyst so as not to initiate polymerization before the homogeneous liquid mixture is actually formed and emulsified in the liquid medium. Thereafter the catalyst may be added to the aqueous medium to initiate the polymerization reaction.

The polymerization of the emulsified liquid mixture is carried out to substantial completion and the dispersed particles of water-insoluble solid latex polymer are formed. Thereafter the finished polymer latex with the insecticide incorporated in the particles may be used in formulating paints and other coating compositions to provide the desired insecticidal activity in the filimous coatings derived therefrom.

The liquid polymerizable material contemplated by the process of the invention may be composed of one or more liquid vinyl-type monomers, and may also include a polymerizable partially polymerized liquid polymer of one or more vinyl-type monomers. Such materials are characteristically insoluble in the aqueous medium for the reaction. Illustratively suitable vinyl-type monomers polymerizable by emulsion polymerization techniques for use in this invention include acrylic acid; methacrylic acid; aryl, alkyl and alkenyl esters of such acids, such as ethyl acrylate (made from acrylic acid and ethanol (ethyl alcohol)), phenyl acrylate, butenyl acrylate, methyl methacrylate, or stearyl methacrylate, including di-esters, such as ethyl hexyl acrylate; aryl and lower alkyl esters, having from one to five carbon atoms per alkyl radical, of unsaturated mono- or dicarboxylic acids, e.g., dibutyl fumarate or monomethyl malate; lower alkenyl esters of saturated carboxylic acids, e.g., vinyl acetate, or propenyl propionate; monoalkenyl benzenes, e.g., styrene; dialkenyl benzenes, such as divinyl benzene; lower monoolefins having from one to five carbon atoms, such as ethylene, propylene and butylene; and lower diolefins, such as butadiene or isoprene. It is to be understood that the basic radical and molecule moieties referred to above may be substituted as well as unsubstituted moieties, e.g. methyl phenyl as well as phenyl fumarate or methacrylate.

Despite the diversity of the chemical classes and specific compounds set forth above, their unifying characteristic is the presence of a vinyl-type linkage, i.e., at least one unsaturated double bond between adjacent carbon atoms. Such a listing is necessarily only illustrative, because a large number of specific vinyl-type monomers cayable of being polymerized by emulsion polymerization techniques are known.

Although my invention may be practiced by using any single monomer alone, it is advantageous to copolymerize two or more monomers, such as styrene and butadiene, or acrylic acid, ethyl acrylate and methyl methacrylate, or vinyl acetate and dibutyl fumarate. Other liquid monomeric materials may be included in the polymerizable mixture but the invention, in this respect, contemplates that the latex polymer will be composed predominantly of monomer units derived from one or more members of the above-identified classes of vinyl-type monomers. Such other monomeric materials may include, for instance, itaconic acid, chloroprene, acrylonitrile, and acrylamide, the latter two illustrating the use of co-monomers having nitrogen atoms.

Latex polymers of the water-insoluble polyvinyl acetate, polystyrene, and polyacrylate types are preferred in water-base paints and floor polish compositions, and in this respect I prefer the use of a water-insoluble liquid polymerizable material in the process which is composed predominantly of one or more polymerizable members selected from the group consisting of acrylic and methacrylic acids, esters of them and the monohydric alcohols having from one to eighteen carbon atoms inclusive, preferably the esters of lower alcohols having from one to four carbon atoms; vinyl acetate; styrene; and the polymerizable liquid polymers thereof.

A wide variety of insecticides may be selected for use in practicing my invention, and an illustrative selection of these is tabulated for easy reference in Table I where the general or trade name used to identify various insecticides and their chemically identifying names are each listed. For the sake of simplicity and clarity, only the general or trade name is used hereinafter in the specification and claims. It is to be understood that insecticides and biologically active pesticides other than those specifically enumerated may be used in practicing the invention.

TABLE I

| | |
|---|---|
| Allethrin | 3-allyl-4-methyl-2-oxo-3-cyclopenten-1-yl ester of 2,2-dimethyl-3-(2-methylpropenyl)cyclopropanecarboxylic acid; also called the allyl homolog of cinerin I. |
| Bayer 39007 (Baygon) | O-isopropoxyphenyl methylcarbamate. |
| Baytex | O,O'-dimethyl-O''-[4-(methylthio)-m-tolyl]-phosphorothioate. |
| Chlordane | 1,2,4,5,6,7,8,8-octachloro-4, 7-methano-3a,4,7,7a-tetrahydroindane. |
| Coral | O,O'-diethyl-O''-[3-chloro-4-methyl-2-oxo-2H-1-benzopyran-7-yl]phosphorothioate. |
| Diazinon | O,O'-diethyl-O''-[2-isopropyl-4-methyl-6-pyrimidinyl]phosphorothioate. |
| Dibrom (Naled) | Dimethyl-1,2-dibromo-2,2-dichloroethyl phosphate. |
| Dieldrin | 1,2,3,4,10,10-hexachloro-6,7-epoxy-1,4,5a,5,6,7,8,8a-octahydro-1,4,5,8-dimethanonaphthalene (endo-exo isomer). |
| Entex | O,O'-dimethyl-O''-[4-(methylthio)-m-tolyl] phosphorothioate. |
| Kepone | Decachloro-octahydro-1,3,4-metheno-2H-cyclobuta[cd]pentalen-2-one. |
| Lethane 384 | β-butoxy, β'-thiocyano-diethyl ether. |
| Lindane | 1,2,3,4,5,6-hexachlorocyclohexane, gamma isomer. |
| Malathion | S-(1,2-dicarbethoxyethyl)-O,O'-dimethyldithiophosphate. |
| Perthane | 1,1-dichloro-α,α-bis(p-ethylphenyl)ethane; also called diethyl diphenyl dichloroethane. |
| Strobane | Terpene polychlorinates (66% Cl). N,N-diethyl-m-toluamide. |

As previously indicated, the insecticidal organic material contemplated for use in the process characteristically is soluble in the liquid polymerizable material and forms a homogeneous liquid solution therewith, and is characteristically substantially insoluble in water. Use of both normally liquid and normally solid insecticides is contemplated in the broader aspects of the invention, and in this respect, it will be understood that the expression "soluble" contemplates the situation where the insecticide is miscible to the desired extent with the liquid polymerizable material and thus capable of forming a homogeneous liquid mixture therewith.

In forming an insecticide containing polymer latex adapted for use in coating compositions, I prefer to use a normally solid water-insoluble chlorinated hydrocarbon insecticide, such as lindane or dieldrin, because of the relatively small quantities which are required of these materials to provide sufficient insecticidal activity in the final coatings. Such insecticides are particularly effective when present in small amounts in water-base coating compositions, and are water-insoluble compounds which resist removal from the coatings by the usual washing procedures to which such coatings may be subjected.

The maximum amount of an insecticide that may be incorporated into a polymer by the processes described is limited to the amount of a specific insecticide that will dissolve in the monomer system used. This in turn depends upon the specific insecticide and the specific monomer system, because the maximum solubilities vary. However, as a general rule, the solubilities of organic insecticides in the monomers of interest is substantial, often being in the range of 10 to 40 parts by weight of insecticide per 100 parts of monomer. The solubility of lindane and dieldrin in several monomers is given in Table II for illustrative purposes.

TABLE II

| Monomeric material | Solubility* at 75° F. | |
|---|---|---|
| | Dieldrin | Lindane |
| Styrene | 15 | 20 |
| Methyl methacrylate | 20 | 20 |
| Styrene-ethyl acrylate (35% styrene by weight) | 20 | 21 |
| Methyl methacrylate-ethyl acrylate (40% methyl methacrylate) | 25 | 22 |

*Approximate solubility in parts per 100 parts monomeric material, by weight.

For most uses, the desired amount of insecticide in the polymer will be less than the solubility-limiting maximum, and will depend on a number of functionally dependent interrelated variables. These variables include the relative toxicity of the insecticide against various species of insects; safety; the relative maintenance of toxicity as time passes; and in coating compositions, the desired amount of insecticide per unit of area of the coating, the amount of the polymer in the coating formulation, and the amount (e.g., the thickness) of the composition actually applied to the area being coated.

By way of illustration, the amount of lindane or dieldrin used is desirably in the range of about 4% to about 12% by weight of the polymer, advantageously in the range of about 6–8%, when the polymer latex is used in making a dry-bright water-based floor polish, which generally will have a total solids content of about 12% to 18%, based on the total polish, and the only source of insecticide is that contained in the polymer particles at the time of polymerization. As a rule of thumb, I prefer to limit the lindane or dieldrin content of water-based floor polishes to about 8 parts by weight per 100 parts of total solids. In the case of water-based paints in which the weight fraction of the polymer latex as well as the total solids content is greater than in floor polishes, the insecticide may comprise in the range of from 1% to about 6%, illustratively 2 to 4%, of the polymer in the latex, and about 0.3% to 3% of the total paint formulation. These amounts are illustrative, and may be increased or decreased as may be required in accordance with the interrelated variables referred to in the preceding paragraph.

The polymerization of the insecticide-containing monomeric material is carried out by a suitable emulsion polymerization procedure, several variations of which are known and commonly employed in the preparation of latex polymers.

In accord with such emulsion polymerization procedures, the monomeric material may be dispersed in the reaction medium, generally water, by means of one or more suitable dispersing or emulsification agents, and the polymerization reaction carried out under reflux conditions or at the lower temperatures usually involved when using a catalyst or an initiator of the reduction-oxidation ("redox") type.

Any suitable dispersing agent may be employed, including such well known dispersing and emulsifying agents as tetra sodium N-(1,2-dicarboxy ethyl)-N-octadecylsulfosuccinamate; dioctyl esters of sodium sulfosuccinic acid; lauryl alcohol sulfate; nonyl phenoxy polyoxyethylene ethanol; sulfonated castor oil; alkyl phenyl polyethylene glycol ethers and sodium salts of alkyl aryl polyether sulfonates, to name but a few. Combinations of a plurality of such agents are often used. The amount of dispersing agent employed will depend on the dispersing qualities of the particular surfactant, the monomers being polymerized, and the particle sizes desired in the finished latex. In general, by using higher concentrations of the surfactants, smaller particle sizes may be obtained. The amount employed, however, should be sufficient to result in a latex having the desired particle sizes, and which in the cases of latex polymers prepared for use in water-based self-polishing compositions are characteristically less than one micron in size, generally in the range of about 0.1 to 1 micron, and may be smaller. For use in paints, the polymer particles typically are made to a larger size, in the range of about one to five microns.

The polymerization reaction may be carried out at temperatures normally employed in emulsion polymerizations. Typically, the polymerization is conducted under reflux conditions, at substantially atmospheric pressure, in which event the reaction temperature is in part dependent upon the monomers used, or at lower temperatures usually involved when using a catalyst or initiator of the reduction-oxidation type is used.

The polymerization catalyst or initiator used in the emulsion polymerization reaction may be any of those known to be suitable for such a reaction, and, since the reaction medium is usually water, may be any suitable water soluble salt which is decomposable to form free radicals to intiate the reaction. Neutral or acid salts often are preferred, to avoid excessively alkaline conditions which are destructive of some insecticides, such as Lindane. Such initiators as potassium persulfate, ammonium persulfate, and hydrogen peroxide are suitable for polymerizations conducted under reflux conditions, and initiators or catalysts of the reduction-oxidation type which depend upon the gain or loss of an electron to form free radicals also may be employed. Such redox catalysts are normally composed of an oxdizing agent and a reducing agent, a suitable combination being ammonium persulfate and sodium metabisulfite. The initiators should be used in small quantities to obtain the desired high molecular weight polymers. When redox catalysts are used, they should be added separately to the reaction vessel, to avoid exhaustion of their redox potential by commingling before coming into contact with the monomers in a suitable polymerization environment.

The invention is further illustrated by the following examples:

Example 1

A latex containing a homopolymer of styrene in the dispersed phase and which is suitable for use in preparing self-polishing water-based coating compositions which contain a residual insecticide may be prepared as follows: A reaction flask was charged with 837 parts of water at room temperature and there was then added to the flask 4.5 parts Igepal CO–880, a nonionic dispersing agent; 38.4 parts Aerosol 22, an anionic dispersing agent; 0.5 part ammonium persulfate (initiator); and 40 parts of a solution of 9 parts lindane and 120 parts of styrene. The lindane-styrene solution was prepared by stiring the normally solid lindane into the liquid momomeric styrene until a homogeneous liquid mixture of the two components was obtained. The addition was made with agitation of the aqueous medium in the flask so as to emulsify the liquid insecticide-containing monomer material in the aqueous medium, and the agitation was continued throughout the polymerization process. The reaction was carried out under reflux conditions, by initially heating the contents of the flask to 180° F. (about 82° C.). At this temperature addition of the remaining portion of the liquid insecticide containing polymerizable monomeric material was started at the rate of 3 parts by weight of the material per minute, and the addition was continued as the temperature of the emulsion is elevated to 190–195° F. (about 88–90° C.). After the balance of the monomeric material was added, the temperature of the aqueous emulsion was increased to 205° F. (about 96° C.) for 30 minutes to complete the polymerization of the remaining monomeric material, the latex then being cooled to room temperature.

Aerosol 22 is a commercially available dispersing agent sold by the American Cyanamid Company and is reported to be a 35% by weight aqueous solution of tetrasodium N-(1,2-dicarboxy ethyl)-N-octadecylsulfosuccinamate, an anionic dispersing agent. Igepal CO–880 is a nonionic dispersing agent reported to be a nonyl phenoxy poly(ethyleneoxy)ethanol sold by the Antara Division of General Aniline and Film Corporation. Both products are commonly employed as dispersants in polymerization procedures of the emulsion type.

The resulting latex polymer contained 7.5% lindane, based on the weight of the polymer, and the latex was entirely suitable for use in preparing water-based self-polishing coating compositions. The polymer showed an excellent particle size for such uses, and there was no decomposition or separation of the lindane during the polymerization procedure, and the insecticide has no apparent effect on the polymerization rate, or particle size of the finished latex polymer.

Example 2

A synthetic polymer latex containing a copolymer of styrene, ethyl acrylate, and acrylic acid, and which was suitable for use in residual insecticide-containing water-based self-polishing coating compositions was prepared as follows: A reaction flask was charged with 836 parts of water at room temperature. Thereafter with agitation 0.5 part of ammonium persulfate (an initiator), 4.5 parts of Igepal CO–880, 38.4 parts of Aerosol 22, and 40 parts of a solution of 9 parts lindane dissolved in a polymerizable monomeric material consisting of 42 parts styrene, 75.6 parts ethyl acrylate and 2.4 parts glacial acrylic acid was added to the reaction flask. The solution was prepared by simply stirring the solid lindane into the liquid polymerizable monomeric material until the lindane had dissolved therein and a homogeneous liquid mixture of the insecticide and polymerizable material was secured. The liquid mixture containing the monomeric material was emulsified in the water by agitation, and the agitation was continued throughout the polymerization procedure. The polymerization was carried out under reflux conditions by initially heating the flask contents to 180° F. As in Example 1, the delayed addition polymerization technique was employed and at this temperature (180° F.) addition of the remaining portion of the liquid mixture of insecticide and monomeric material was started at the rate of 3 parts by weight per minute. The temperature of the emulsion was elevated to 190–195° F. as the addition of the balance of the monomeric material proceeded, and after all of the monomeric material was added, the temperature was increased to 205° F. and held at that temperature for 30 minutes to complete the polymerization of the remaining monomeric material. Thereafter the latex was cooled to room temperature.

The synthetic polymer latex resulting was entirely suitable for use in water-based self-polishing coating compositions and exhibited good gloss and leveling properties as well as having an excellent particle size. The polymer latex contained 7.5% by weight of insecticide on the weight basis of the polymer content and there was no separation of the lindane during the polymerization procedure. It was also observed that the insecticide apparently advantageously accelerated the polymerization reaction.

Example 3

A polymer latex containing a water-insoluble thermoplastic acrylic polymer in the dispersed phase and which was suitable for use in residual insecticide containing water-based self-polishing coating compositions was prepared as follows: A reaction flask was charged with 792 parts water at room temperature. Thereafter, and with agitation of the water, a redox catalyst consisting of 0.8 part ammonium persulfate and 0.8 part sodium bisulfite, 85.6 parts of Triton X–200, and 40 parts of a homogeneous liquid mixture of 9 parts lindane and a liquid polymerizable monomeric material consisting of 69.6 parts ethyl acrylate, 48 parts methyl methacrylate and 2.4 parts glacial acrylic acid were added to the reaction flask. The reaction mixture in the flask was agitated to form an emulsion of the liquid mixture containing the monomeric material in the water, and the agitation was thereafter continued throughout the polymerization procedure. The polymerization was carried out by initially heating the flask to 180° F. At this temperature, addition of the remaining portion of the insecticide containing monomeric material was started at the rate of 3 parts by weight per minute, and the temperature of the emulsion was elevated to 190–195° F. during the addition of the remaining portion. After all of the liquid mixture had been added to the flask, the temperature was increased to 205° F. and held thereat for 30 minutes to complete the polymerization of the added monomeric material. Thereafter the latex was cooled to room temperature.

Triton X–200 is a 28% by weight solution of sodium salt of an alkyl aryl polyether sulfonate marketed by the Rohm & Haas Company and is an anionic dispersing agent commonly employed in aqueous emulsion polymerization procedures.

The polymer latex was suitable for use in water-based self-polishing coating compositions and the dispersed latex polymer therein showed an extremely fine particle size, which especially is desirable in such compositions. Use of the redox catalyst in the reflux polymerization procedure is especially suitable for producing a fine particle size. Use of the latex in a floor finish formulation showed good gloss or brightness as well as good leveling properties. On the basis of its polymer content, the latex contained 7.5% by weight of lindane in the dispersed polymeric material.

Example 4

A latex polymer of methyl methacrylate containing a high concentration of an insecticide was prepared as follows: A reaction flask was charged with 60 parts of room temperature water, 2.2 parts Igepal CO–880, 2.2 parts Aerosol 22 and a solution of 7 parts of lindane in 35 parts of monomeric methyl methacrylate. The liquid polymerizable mixture was prepared as before. The reaction mixture was then agitated to emulsify the liquid polymerizable mixture of lindane and monomeric material in the water, and a reduction-oxidation catalyst consisting of 0.5 part ammonium persulfate and 0.5 part sodium bisulfite was added to the flask to initiate polymerization of the monomeric material. Due to the exothermic nature of the reaction, the temperature of the emulsion increased to 70–75° C. and the temperature was maintained in this range until the polymerization was completed and the free monomer content was less than 0.5% by weight of the polymer.

After cooling, the synthetic polymer latex showed excellent particle size for use in water-based coating compositions of the type which dry to a bright filimous insecticidal coating. It contained 20% by weight of lindane on the basis of the dispersed resin and was entirely suitable for use as an emulsion polymer containing an insecticide in concentrated form, the latex being suitable for blending with other dispersed film forming materials to produce a finished coating composition having the desired amount of lindane therein.

In contrast to the latex product obtained by the above procedure, attempts to dissolve lindane directly in similar latexes of methylmethacrylate by the procedure disclosed in U.S. Patent No. 3,156,661 have resulted in a maximum solubility of only about 3% lindane on the basis of the polymer.

Example 5

A polymer latex having a water-insoluble thermoplastic homopolymer of styrene that contained a high concentration of insecticide was prepared as follows: A reaction flask was charged with 60 parts of room temperature water, 5 parts Igepal CO–880, 1.5 parts Aerosol 22, and a homogeneous liquid mixture or solution of 7 parts lindane in 35 parts of liquid monomeric styrene. The reaction mixture was then agitated to emulsify the liquid mixture containing the monomeric material therein, and a redox catalyst consisting of 0.5 part ammonium persulfate and 0.5 part sodium bisulfite added thereto so as to initiate the polymerization of the polymerizable monomeric material. Due to the exothermic nature of the reaction, the temperature rose to 70–75° C. and the temperature of the emulsion was maintained in this range until the free monomer content was less than 0.5% by weight of the polymer. The latex was then cooled to room temperature.

The resulting polymer latex was suitable for use in formulating water-based residual-insecticide containing self-polishing coating compositions by blending with other dispersed film forming materials, and contained 20% by weight of lindane, based on the polymer content, the particle size of the dispersed polymeric material being excellent for such uses. Similar latex homopolymers of styrene but without the insecticide exhibit a solubility for lindane of only about 1% based on the weight of the polymer when the direct solution methods of U.S. Patent No. 3,156,661 are employed.

Example 6

A water-based self-polishing coating composition containing a residual insecticidal material was prepared and tested as follows:

*Base emulsion A.*—A base emulsion for use in the water-based coating composition was prepared by first forming an initial melt of film forming waxy material by heating 17.8 parts of Epolene LVE, 17.8 parts of Cardis Polymer 10 and 8 parts of oleic acid together. The temperature of the melt was thereafter adjusted to 99° C. and a boiling solution of 2.5 parts caustic potash and 0.2 part borax in 5 parts water was slowly emulsified therein with continuous stirring. Thereafter, 6.2 parts of morpholine were added and stirred into the melt for 5 minutes to form the dispersing agent for the emulsion. The melt was then rapidly added with vigorous agitation to 326 parts of boiling water to disperse the melt in the water and to form a base emulsion of waxy material, the base emulsion then being cooled to room temperature and employed as indicated hereinafter in the preparation of a residual insecticide containing self-polishing coating composition.

Epolene LVE is a low molecular weight polyethylene wax marketed by the Eastman Chemical Products, Inc. of Kingsport, Tenn., for use in such floor finishes, and Cardis Polymer 10 is an oxidized microcrystalline wax, marketed by the Warwick Wax Division of the Western Petrochemical Corporation of New York, N.Y., also for use in such floor finishing compositions. Both waxes are commonly employed in preparing self-polishing coating compositions and have the following characteristics:

|  | Cardis Polymer 10 | Epolene LVE |
| --- | --- | --- |
| Saponification Value | 25–30 | 25–30 |
| Acid Value | 8–10 | 12–16 |
| Melting Point, ° C. | 100–102 | 104–105 |

*Polymer latex A.*—A latex copolymeric product of the emulsion polymerization of styrene, ethyl acrylate and acrylic acid having a residual insecticide incorporated therefrom was prepared by the following reflux procedure: A reaction flask was first charged with 836 parts water. Thereafter 0.5 part of ammonium persulfate, 4.5 parts Igepal CO–880 and 38.4 parts Aerosol 22 were added to and dissolved in the water. The aqueous solution was then heated to 70° C., and one-third of a homogeneous liquid mixture or solution of 9 parts lindane in a polymerizable monomeric material consisting of 42 parts styrene, 75.6 parts ethyl acrylate, and 2.4 parts glacial acrylic acid was then added to the aqueous contents of the flask. The monomeric material was emulsified in the aqueous solution by agitation and the emulsion was then heated to 82° C. At this temperature, addition of the balance of the liquid mixture of insecticide and liquid monomeric material was started at the rate of 3 parts per minute and the temperature was maintained thereat throughout the addition of the balance. Following addition of the insecticide containing monomeric material, the temperature was elevated to 90–95° C. and held for 30 minutes to complete the polymerization, the resulting latex then being cooled to room temperature.

*Water-based self-polishing coating composition A.*—A water-based self-polishing coating composition which was driable to a bright lustrous coating that was insecticidally active was prepared from the above-described base emulsion A and polymer latex A as follows: 15 parts of base emulsion A was mixed with 66.25 parts of polymer latex A, and to the mixture was then added: 18.75 parts of an alkaline solution consisting of 82 parts of water, 6 parts of a 26 Baumé solution of ammonia in water, and 12 parts of Waterez 1582. Waterez 1582 is a commercially available alkali soluble resinous product of the condensation of phthalic anhydride with polyols, and is marketed by the Reichhold Chemical Company, Inc., of Elizabeth, N.J., for use in self-polishing coating compositions. Preparation of the finished coating composition was then completed by adding 0.5 part of diethylene glycol monoethyl ether and 0.5 part of tributoxy ethyl phosphate to the mixture to act as plasticizers.

Tests conducted to determine the insecticidal activity of coatings obtained from the finished coating compositions were then made by coating vinyl asbestos tiles, and exposing adult German (*Blatella germanica*) roaches to the coated tiles under control conditions, the tiles being permitted to dry for about 48 hours prior to such exposure. It was determined that 95% of the roaches exposed to the tiles were dead after 48 hours exposure and that 97.5% were dead or dying after 72 hours exposure to the coated tiles.

Example 7

*Polymer latex B.*—A latex product of the emulsion polymerization of styrene which contained dieldrin in the dispersed phase of the polymer latex was prepared as follows: A reaction flask was first charged with 837 parts of water. Thereafter 4.5 parts Igepal CO–880, 38.4 parts Aerosol 22, and 0.5 part ammonium persulfate were added to the flask and dissolved in the water. The aqueous solution was then heated to 70° C. with agitation, and one-third of a solution of 9 parts dieldrin in 120 parts of styrene was then added to the aqueous solution and emulsified therein by agitation. The solution was prepared by stirring the solid dieldrin in the liquid monomeric styrene to effect mixing thereof until a homogeneous mixture of the two components resulted. The polymerizable mixture in the flask was then heated to 82° C. At this temperature addition of the balance of the insecticide containing monomeric material was started at the rate of 3 parts thereof per minute. Throughout the addition of the balance of the insecticide containing monomeric material, the mixture was refluxed at about 82° C. and constantly stirred. After the balance had been added, the flask was heated to 90–95° C. and refluxed thereat for 30 minutes to complete the polymerization process, the resulting polymer latex thereafter being cooled to room temperature.

*Water-based self-polishing coating composition B.*—A water-based self-polishing coating composition was prepared from polymer latex B by first admixing 66.25 parts of the polymer latex with 15 parts of base emulsion A (see Example 6). Thereafter, 18.75 parts of an aqueous solution consisting of 82 parts water, 12 parts of Waterez 1582 and 6 parts of a 26 Baumé solution of ammonia in water were added to the emulsion-latex mixture. The finished coating composition was completed by mixing 0.7 part tributoxyethyl phosphate and 0.7 part dibutyl phthalate therewith to function as plasticizers.

The finished composition, upon being applied to tiles, dried to a bright protective filimous coating. Tests conducted to determine the insecticidal activity of the coatings obtained from the finished composition were conducted by coating vinyl asbestos tiles with the composition and by exposing adult German roaches to the coated tiles. The coatings were permitted to dry for 48 hours prior to such exposure. It was determined that 97.5% of the roaches were dead or dying after 72 hours' exposure to the thus coated tiles.

Table III illustrates the properties of various polymer latexes prepared in accord with the process disclosed herein and which contained different insecticides. To prepare the insecticide-containing polymer latexes illustrated in Table III, 5 parts of the insecticide were mixed with 100 parts of a liquid polymerizable material consisting of 50 parts styrene, 20 parts ethyl hexyl acrylate, 25 parts methyl acrylate and 5 parts methacrylic acid to form a homogeneous liquid mixture of the components. The liquid mixture was then emulsified in 50 parts of water having 5 parts of added surfactant by rapid stirring. Approximately 10% of the monomer emulsion was added to a polymerization reactor containing 100 parts water, 2 parts of surfactant and 1 part of ammonium persulfate. The surfactant was a 50:50 mixture of Triton X–200 and Tergitol No. 4. The latter is sodium ethyl hexyl sulfonate, marketed by Union Carbide & Chemicals.

To effectuate polymerization, the reactor contents were heated to 90° C. with rapid stirring, a water cooling jacket being provided to maintain this temperature during the polymerization reaction. The balance of the emulsion was gradually added to the reactor over a two hour period. During this period, the reactor contents were constantly stirred and maintained at 90° C. to complete the reaction.

TABLE III.—PROPERTIES OF ILLUSTRATIVE INSECTICIDE-CONTAINING POLYMER LATEXES

| Insecticide | Solids, percent | pH | Brookfield Viscosity, cps. | Particle Size by Light Absorption, at 650 m$\mu$ | Sediment, percent | Oven Stability | Freeze Thaw Stability |
|---|---|---|---|---|---|---|---|
| None | 42.3 | 7.7 | 55.4 | 9.3 | 0.1 | OK | OK |
| Malathion | 41.5 | 7.6 | 29.4 | 13.5 | 0.1 | OK | |
| Chlordane | 42.0 | 7.8 | 47.5 | 10.8 | 0.1 | OK | OK |
| Dibrom | 38.8 | 5.6 | 9.2 | 100 | 0.2 | OK | |
| Lethane | 41.2 | 7.8 | 41.9 | 11.0 | 0.1 | OK | |
| Diazinon | 41.9 | 7.3 | 14.4 | 74.0 | 0.2 | OK | |
| Bayer 39007 | 42.0 | 7.7 | 21.8 | 24.1 | 0.2 | OK | OK |
| Strobane | 41.3 | 8.3 | 25.9 | 11.0 | 0.1 | OK | OK |
| Perthane | 41.8 | 7.9 | 35.5 | 20.0 | 0.1 | OK | OK |
| Allethrin | 41.3 | 7.9 | 30.6 | 12.5 | 0.1 | OK | OK |
| Kepone | 42.0 | 8.0 | 31.6 | 17.6 | 0.2 | OK | OK |
| Coral | 41.7 | 8.0 | 32.5 | 16.5 | 0.1 | OK | OK |
| Lindane | 39.6 | 8.0 | 29.4 | 13.4 | 0.1 | OK | OK |

The products of the polymerizations are semitranslucent fine particle sized fluid polymer latexes having approximately 40% solids content by weight and may be used to impart insecticidal activity to water base coating compositions such as water-based paints and floor polishes.

The polymer latexes of Table III were used as components in a standard dry-bright floor polish formulation to enable comparison of their influence on gloss, leveling, recoat and water spot properties of the formula, the results being reported in Table IV.

TABLE IV.—FLOOR POLISH PERFORMANCE OF FORMULATIONS WITH DIFFERENT INSECTICIDAL POLYMERS

| Insecticide | Gloss | Leveling | Recoat | Water Spot |
|---|---|---|---|---|
| Control | E | OK | OK | OK |
| Malathion | G | OK | OK | OK |
| Chlordane | G | OK | OK | OK |
| Lethane | E | OK | OK | OK |
| Diazinon | E | OK | OK | OK |
| Bayer 39007 | E | OK | OK | OK |
| Strobane | G | OK | OK | OK |
| Perthane | G | OK | OK | OK |
| Allethrin | G | OK | OK | OK |
| Kepone | G | OK | OK | OK |
| Coral | E | OK | OK | OK |
| Lindane | E | OK | OK | OK |

E-Excellent. G-good.

Examples 9–13

Examples 9–13 exemplify the preparation of insecticide-containing ethyl acrylate-methyl methacrylate copolymers in the form of polymer latexes using lindane and dieldrin at two different concentrations, the use of such latexes in the manufacture of paints, and the effectiveness of such paints in killing roaches.

The basic recipe and the process of preparing the polymer latexes were the same for each of Examples 9–13. In making the polymer latex used in Example 9, an aqueous solution was first prepared comprising 82 parts by weight of a commercial sodium alkylaryl polyether sulfonate, 81.2 parts of sodium lauryl sulfate, 18.2 parts of itaconic acid, 0.103 part of ferrous sulfate heptahydrate (FeSO$_4$·7H$_2$O) and 1007.7 parts of water. Such solution was then added to a reaction vessel equipped with a reflux condenser, a mechanical stirrer and a thermometer. Thereafter in a separate vessel there were mixed together part of the comonomers comprising 440.7 parts of ethyl acrylate and 160.5 parts of methyl methacrylate. The mixture of monomers was then added with stirring to the previously described aqueous solution. The resultant composition was then cooled to about 25° C.

Polymerization was initiated by adding to such composition a solution comprising 2.6 parts of ammonium persulfate in 23.5 parts of water, followed by the addition of a solution comprising 1.3 parts of sodium hydrosulfite in 11.6 parts of water. Stirring of the reaction mixture was continued. In a few minutes the temperature of the reaction mixture began to rise and continued to rise, reaching about 90° C. The reaction mixture was then cooled.

Thereafter, a previously prepared third composition was added to the reaction vessel with continuous stirring. This third composition comprised 36.5 parts of sodium alkylaryl polyether sulfonate, 36.1 parts of sodium lauryl sulfate, 273.1 parts of water, 21.8 parts of itaconic acid, 559.2 parts of ethyl acrylate, and 182.7 parts of methyl methacrylate (being the remainder of the monomers). Then a polymerization initiator solution comprising 2.6 parts of ammonium persulfate in 3.5 parts of water was added to the vessel, followed by a solution of 1.3 parts of sodium hydrosulfite in 11.6 parts of water. Shortly after these ingredients were added, the temperature of the mixture rose again, to a maximum of about 85° C. Stirring was continued and the contents of the reaction vessel slowly cooled to 30° C. When the temperature reached 30° C., a mixture comprising 4.5 parts of cumene hydroperoxide mixed with 4.5 parts of water was added, followed by the addition of a mixture comprising 0.9 part of ascorbic acid in 8.1 parts of water.

After standing about 25 minutes, a blend of 6.0 parts of formaldehyde (37%) and 6.0 parts of water was added to the reaction vessel. Thereafter, aqueous ammonium hydroxide was then added until the pH of the reaction mixture reached the range of 6.5–7.0. This completed the preparation of the polymer latex, the product being a dispersion in water of an interpolymer of ethyl acrylate, methyl methacrylate and itaconic acid.

The procedure and recipe for such polymer latex, had been previously proven to be useful in industrial paint applications.

The polymer latex used in Example 10 was made by the same procedure described above, except that 12.4 parts of lindane were dissolved in the first mixture of monomers (440.7 parts of ethyl acrylate and 160.5 parts of methyl methacrylate) prior to the addition of such mixture to the reaction vessel, and further except that the third composition included 15.3 parts of lindane. The polymer latex contained 2% based upon total solids, of lindane.

The polymer latex used in Example 11 was made as described in respect of Example 10, except that the amounts of lindane were doubled. The finished polymer latex contained 4% lindane.

The polymer latex used in Example 12 was made as described with respect to Example 10, except that dieldrin was substituted on an equal weight basis for the lindane used in Example 10. The finished polymer latex contained 2% dieldrin.

The polymer latex used in Example 13 was made as described in respect of Example 10, except that dieldrin was used, instead of lindane, and that the amounts of the insecticide were doubled. The finished polymer latex contained 4% of dieldrin.

The polymer latexes described in the preceding paragraphs were formulated into paints, using a white pigment paste, the recipe of which is set forth in the following Table V.

TABLE V.—WHITE PIGMENT PAINT PASTE RECIPE

|  | Parts by weight |
|---|---|
| Tamol | 10 |
| TiO$_2$ RA50 | 2250 |
| Canel Carb | 2000 |
| Dispersagen 15 | 45 |
| R-Casein | 327 |
| Igepal CO–630 | 20 |
| Ethylene glycol | 200 |
| Carbitol | 70 |
| Carbitol acetate | 30 |
| NH$_4$OH (28%) | 50 |
| Nopco NDW | 20 |
| Cellosize QP–15,000 | 25 |
| Water | 2700 |

Tamol 850 was used as a dispersing agent and is reported to be a sodium salt of a polymeric carboxylic acid obtainable from the Rohm & Haas Company. Canel Carb was used as a filler and is reported to be calcium carbonate. Dispersagen 15 was used as a suspending agent and is reported to be lethicin. R-Casein was used as a dispersing agent. Igepal CO–630 was used as a nonionic surfactant and is reported to be a nonylphenoxy poly(ethyleneoxy) ethanol obtainable from the Antara Division of General Analine & Film Corp. Nopco NDW was used as a defoaming agent and was obtained from the Nopco Chemical Company. Cellosize QP–15,000 was used as a dispersing agent and is reported to be a hydroxyethyl cellulose obtainable from the Union Carbide & Chemicals Corp.

The paints of Examples 10 and 12 contained 0.31% by weight of insecticide, and those of Examples 11 and 13 contained 0.62% insecticide, on a total (wet) paint composition basis. As a percentage of total paint solids, the insecticide contents were 0.58 and 1.17% respectively. Table VI summarizes the finished paint formulations of Examples 9–13. The Brookfield viscosity data were obtained using a No. 2 spindle at 12 r.p.m.

TABLE VI.—CHARACTERISTICS OF THE PAINTS OF EXAMPLES 9-13

| Example No. | 9 | 10 | 11 | 12 | 13 |
|---|---|---|---|---|---|
| Insecticide | None | Lindane | Lindane | Dieldrin | Dieldrin |
| Insecticide, percent of total paint | 0 | 0.31 | 0.62 | 0.31 | 0.62 |
| Polymer-latex, parts by weight | 296 | 296 | 296 | 296 | 296 |
| Pigment paste, parts by weight | 603 | 603 | 603 | 603 | 603 |
| Paint Characteristics: | | | | | |
| pH | 8.2 | 8.3 | 8.6 | 8.7 | 8.7 |
| Viscosity (Brookfield) | 1,900 | 1,600 | 1,600 | 1,500 | 1,600 |
| Hiding power | Good | | | | |
| Brushability | Fair | | | | |

The effectiveness of the insecticide-containing polymer latexes when formulated into paints and painted on panels was tested against *Blatella germanica* roaches from a group known as the "Orlando Normal Colony" of roaches. The paint was applied to the panels by conventional means. The roaches were exposed continuously to the painted test panels and the percent of roaches killed was recorded at various intervals.

and shall be compared to the paint of Example 11, which contains 0.62% lindane on a total paint basis. In a similar manner, a test panel designated No. 9-X-2 had a solution of 0.6% dieldrin applied over the paint of Example No. 9; the results should be compared to the paint of Example No. 13. This panel is also referred to in Table IX.

TABLE VII.—ROACH TESTS ON WOODEN PANELS A FEW DAYS AFTER PAINTING

| Paint of Example No. | 9 | 10 | 11 | 12 | 13 | 9-X-1 | 9-X-2 |
|---|---|---|---|---|---|---|---|
| Insecticide | None | Lindane | Lindane | Dieldrin | Dieldrin | Lindane | Dieldrin |
| Insecticide, percent of total paint | 0 | 0.31 | 0.62 | 0.31 | 0.62 | (1) | (1) |
| Roach Kill Data, percent killed after indicated hours of exposure: | | | | | | | |
| 6 hours | 0 | 0 | 20 | 0 | 0 | 20 | 0 |
| 12 hours | 0 | 0 | 30 | 0 | 0 | 30 | 0 |
| 24 hours | 0 | 100 | 100 | 10 | 40 | 60 | 10 |
| 36 hours | 0 | 100 | 100 | 40 | 60 | 60 | 25 |
| 48 hours | 0 | 100 | 100 | 45 | 75 | 80 | 60 |
| 72 hours | 0 | 100 | 100 | 60 | 80 | 85 | 65 |

[1] See text.

In roach tests of the type used, the roaches are in a confined zone, the horizontal bottom surface of which was the painted test panel. However, the roaches do not necessarily spend the entire time walking on the test panel, but from time to time walk on the walls of the confined zone. Hence, the test results tend to understate the effectiveness of the insecticide relative to the results which could be obtained in a building in which the only surfaces available to the insects are coated with a composition containing an insecticide-containing polymer.

The roach tests were made using both 6″ x 6″ wooden and 8″ x 8″ concrete test panels painted with brushes with the paints of Examples 9-13, using two coats of paint. The paints had acceptable paint characteristics of brushability, leveling, covering ability, etc.

The first tests were made using the 6″ x 6″ wooden panels a few days after painting. The results are reported in Table VII as the percentage of roaches killed after various time intervals, from 6 to 72 hours, of exposure of the roaches to the painted panels. For comparison, a solution of 0.6% lindane dissolved in xylenes was applied to a spare test panel that had been painted with No. 9 paint; the results are reported under code No. 9-X-1, The second set of roach tests were made on painted 8″ x 8″ concrete panels after having been aged one month indoors. These results are reported in Table VIII.

TABLE VIII.—ROACH KILL DATA ON CONCRETE PANELS AGED INDOORS ONE MONTH

| Paint of Example No. | 9 | 10 | 11 | 12 | 13 |
|---|---|---|---|---|---|
| Insecticide | None | 0.31% Lindane | 0.62% Lindane | 0.31% Dieldrin | 0.62% Dieldrin |
| Roach kill, percent after— | | | | | |
| 24 hours | 0 | 5 | 60 | 20 | 40 |
| 32 hours | 0 | 30 | 60 | 20 | 40 |
| 48 hours | 0 | 40 | 65 | 90 | 85 |
| 56 hours | 0 | 50 | 90 | 95 | 100 |
| 72 hours | 0 | 60 | 100 | 100 | 100 |
| 96 hours | 0 | 60 | 100 | 100 | 100 |

The third and fourth aging tests were made on the wooden panels that had been aged indoors, and outdoors, for three months, and on the concrete panels that had been aged six months. The aging was done in Florida. The data are reported in Table IX. For comparison in respect of the three-month aging tests, new panels painted only a few days with the paints of Example 11 and 13 were tested at the same time. The painted panel denoted 9-X-2, previously described, was also tested after three months' aging.

These roach test results of Tables VII-IX demonstrate that a paint made from a polymer latex in which the insecticide was dissolved in the monomer at the time of polymerization are not only effective in killing roaches, but is initially more effective than the same insecticide applied to a surface in the form of a solution from which the solvent evaporates, and the relative advantages in effectiveness increases with time. The test results also demonstrate that lindane is initially more effective than dieldrin against roaches, but that dieldrin is superior in retaining its insecticidal toxicity.

TABLE IX.—ROACH TESTS ON PANELS AGED THREE AND SIX MONTHS

| Paint of Example No | 10 | 11 | 11 | 11 | 12 | 12 | 13 | 13 | 13 | 9-X-2 |
|---|---|---|---|---|---|---|---|---|---|---|
| | 0.31% Lindane | 0.62% Lindane | | | 0.31% Dieldrin | | 0.62% Dieldrin | | | (See Text) |
| 3 Months' Aging Tests Using Wooden Panels; | | | | | | | | | | |
| Aging Period | Several days | 3 mos | 3 mos | | | | Several days | 3 mos | 3 mos | 3 mos. |
| Where Aged | | Indoors | Outdoors | | | | | Indoors | Outdoors | Outdoors. |
| Roaches Killed, percent | | | | | | | | | | |
| 24 hours | 95 | 70 | 10 | | | | 70 | 20 | 25 | 5. |
| 30 hours | 100 | 70 | 20 | | | | 80 | 45 | 45 | 10. |
| 48 hours | 100 | 80 | 30 | | | | 100 | 100 | 100 | 30. |
| 54 hours | 100 | 80 | 40 | | | | 100 | 100 | 100 | 30. |
| 72 hours | 100 | 90 | 50 | | | | 100 | 100 | 100 | 30. |
| 120 hours | 100 | 100 | 70 | | | | 100 | 100 | 100 | 60. |
| 6 Months' Aging Tests Using Concrete Panels; | | | | | | | | | | |
| Aging Period | 6 mos | | | | 6 mos | 6 mos | 6 mos | | | 6 mos |
| Where Aged | Indoors | | | | Outdoors | Indoors | Outdoors | | | Outdoors |
| Roaches Killed, percent | | | | | | | | | | |
| 24 hours | 0 | | | | 0 | 15 | 0 | | | 5 |
| 48 hours | 15 | | | | 0 | 100 | 70 | | | 70 |
| 72 hours | 55 | | | | 0 | 100 | 90 | | | 100 |
| 96 hours | 80 | | | | 0 | 100 | 100 | | | 100 |

After a total of ten months of aging, no deterioration of the adhesion and appearance of the panels aged indoors was perceivable. Some flaking was perceivable on the panels aged outdoors; this is believed to be attributable to the basic paint formulation and not to the inclusion of the insecticide in the polymer latex.

Examples 14–23

Examples 14–23 further exemplify the preparation of insecticide-containing polymers, using different monomers, different insecticides and different variations of emulsion polymerization techniques.

The paint of Example 14 was a control example and did not contain any insecticide. The polymer latex for it was made by adding 322.7 grams of deionized water at room temperature to a 1 liter stirred-type glass vessel provided with a thermometer, a dropping funnel and a reflux condenser. Thereafter, the following ingredients were added to the vessel, with stirring: 92.6 grams of a 28% (by weight) solution of a sodium salt of an alkylaryl polyether sulfonate and 0.4 gram of sodium carbonate; and finally 35% by volume of a mixture which originally contained 234.1 grams of ethyl acrylate, 115.3 grams of methyl methacrylate and 5.4 grams of methacrylic acid, being in a weight ratio of 66/32.5/1.5. (The remaining 65% of such mixture was added subsequently as hereinafter described.)

The mixture of liquids in the vessel was then sparged with nitrogen for 15 minutes. Thereafter, 19.4 grams of a 4% (by weight) aqueous solution of ammonium persulfate and 8.0 grams of a 10% aqueous solution of sodium meta-bisulfite were added separately to the vessel. As soon as the temperature of the liquid mixture in the vessel began to rise, the remaining 65% of the mixture of monomers was added to the vessel. This addition was made slowly, requiring between 1.5 and 2 hours at a uniform rate, while the temperature of the reaction mixture was maintained in the range of 40°–60° C. After all of the monomer mixture had been added, the temperature of the reaction mixture was increased to 90° C. and maintained at that temperature for one hour. The reaction mass in the vessel was then cooled to room temperature and 3.2 grams of a 40% aqueous solution of a sodium polyacrylate thickener was added. The pH of the reaction mixture was then adjusted to the range of 8.5–9.0 with a 28% aqueous ammonia solution to complete the preparation of the polymer latex. The polymer latex had a solids content of 47.0%, and a viscosity of 480 cps. (Brookfield LVF No. 1 spindle at 12 r.p.m.).

The polymer latex used for the paint of Example 15 was prepared in the same manner as that for Example 14, except that the mixture of monomers was adjusted to comprise 223.9 grams of ethyl acrylate, 110.3 grams of methyl methacrylate, and 5.1 grams of methacrylic acid in which had been dissolved 15.4 grams of Baytex. The monomer ratio of 66/32.5/1.5 was retained.

The polymer latex for the paint of Example 16 was prepared in the same manner as that for Example 15, except that an equal weight of Diazinon was used instead of Baytex.

The polymer latex for Example 17 was prepared in the same manner as that for Example 15, except that an equal weight of dieldrin was substituted for the Baytex.

The polymer latex for Example 18 was prepared in the same manner as the polymer latex for Example 15, except that an equal weight of lindane was substituted for the Baytex.

The final solids content of the latex for Example 18 was 46.0%, and the latex had a viscosity of 330 cps. (Brookfield LVF No. 1 spindle at 12 r.p.m.).

The polymer latex for the paint of Example 19 was made by copolymerizing styrene and butadiene according to the following procedure. The reaction vessel was a six-ounce bottle provided with a cap sufficient to withstand moderate increases of pressure within the bottle. To the bottle was added 55.9 grams of deoxygenated deionized water. Thereafter, 3.0 grams of an 80% aqueous solution of a sodium salt of a dihexyl ester of sulfosuccinic acid, 5.3 grams of a 45% aqueous solution of sodium dodecyl diphenyl ether disulfonate, 0.72 gram of potassium persulfate, and 0.36 gram of sodium bicarbonate. Then solution of 2.42 grams of lindane dissolved in 33.9 grams of styrene was added to the vessel. The bottle was then sparged for 15 minutes with nitrogen, then weighed on a balance and slightly more than 18.3 grams of distilled butadiene was added. The excess butadiene was allowed to evaporate and thereby purge the bottle of air. The weight ratio of the styrene to butadiene was 65:35. The bottle was then capped and rotated in a constant temperature bath held at 60° C. for 16 hours, during which the styrene and butadiene copolymerized to form the polymer latex. The solids content of the resulting polymer latex was 49.8.

The polymer latex for the paints of Examples 20 and 21 was made by copolymerizing vinyl acetate and dibutyl fumarate, using the monomer feed variation of aqueous emulsion polymerization techniques.

The latex for Example 20 was prepared by first adding 8 grams of Elvanol 51–05 (a polyvinyl alcohol) and 2 grams of Elvanol 50–42 (a polyvinyl alcohol) to 344.8 grams of deionized water under agitation and at room temperature. The resulting mixture was heated to 80° C.

and held at that temperature for approximately one hour, until the polyvinyl alcohol had dissolved. The mixture was then cooled to room temperature and filtered through a cheesecloth. The solution so prepared was added to a 1 liter glass stir-type reaction vessel which was provided with a thermometer, a dropping funnel and a reflux condenser. Thereafter there was added to the vessel 4.2 grams of a 75% solution of a sodium salt of a dioctyl ester of sulfosuccinic acid, 0.8 gram potassium persulfate, 0.4 gram of benzoyl peroxide, and 0.48 gram of sodium bicarbonate. Thereafter 10% of a monomer solution containing 18.1 grams of lindane dissolved in 337.0 grams of vinyl acetate and 84.1 grams of dibutyl fumarate was added to the reaction vessel. The reaction vessel was then heated with a water bath to refluxing temperature (65–66° C.). After the refluxing had subsided, the temperature of the reaction mixture was raised to 75° C. and the remaining 90% grams of lindane were not dissolved in the mixture of vinyl acetate and dibutyl fumarate, but instead were added to the reaction vessel after the potassium persulfate and before the addition of the 321.8 grams of deionized water. The resulting polymer latex contained 55.1% solids and had a viscosity of 1000 cps. (Brookfield model LVF No. 3 spindle at 60 r.p.m.).

Lemol 22–88 was used as a suspending agent and is reported to be a medium viscosity polyvinyl alcohol, 88% hydrolyzed, obtainable from the Borden Company. Elvanol 51–05 and Elvanol 50–42 were used as suspending agents and are reported to be, respectively, low and high viscosity polyvinyl alcohols, 88% hydrolyzed, obtainable from E. I. du Pont de Nemours & Co. Inc.

Paints were formulated from the polymer latexes described above using the paint formulations given in Table X.

TABLE X.—PAING FORMULATIONS FOR EXAMPLES 14–23

| Paints of Examples No. | 14–18 | | 19 | | 20–23 | |
|---|---|---|---|---|---|---|
| | Parts by Weights | Vol. Percent | Parts by Weight | Vol. Percent | Parts by Weight | Vol. Percent |
| Ingredients: | | | | | | |
| T. Pure R–901 | 200 | 6.0 | 200 | 6.0 | 200 | 6.0 |
| Drikalite | 450 | 20.0 | 450 | 20.0 | 450 | 20.0 |
| Daxad 30 | 5 | | 5 | | 5 | |
| Colloid 606 | 2 | | 2 | | 2 | |
| Ethylene glycol | 28 | | 28 | | 28 | |
| Hexylene glycol | 7 | | | | 7 | |
| Troysan PMA–30 | 0.3 | | 0.3 | | 0.3 | |
| Igepal CO–610 | 2 | | 2 | | 2 | |
| Natrosol 250 H..R. (3%) | 75 | 9.0 | 92 | 11.0 | 75 | 9.0 |
| Water | 167 | 20.0 | 183 | 22.0 | 192 | 23.0 |
| Polymer Latex (described herein) | 356 | 40.0 | 312 | 37.0 | 329 | 37.0 |
| Totals | 1,292.0 | 100 | 1,274.3 | 100 | 1,290.3 | 100 | of the insecticide-containing monomer solution was fed to the flask through the dropping funnel over a 3 hour period, while the temperature of the reaction mixture was maintained at about 75–80° C. After all the monomer had been fed to the reaction vessel, the temperature was increased to 90–92° C. and maintained at that temperature for half an hour. The resulting batch of polymer latex was then cooled to room temperature. It had a solids content of 55.1% and a viscosity of 1560 cps. (Brookfield model LVF No. 3 spindle at 60 r.p.m.).

The polymer latex used in the paint of Example 21 was made by the same procedure as described in the preceding paragraph, except that an equal weight of dieldrin was substituted for the lindane dissolved in the monomeric solution of vinyl acetate and dibutyl fumarate.

The polymer latexes for the paints of Examples 22 and 23 were also made by copolymerizing vinyl acetate and dibutyl fumarate, using a batch process of emulsion polymerization.

A one liter stirred-type glass vessel provided with a thermometer, a dropping funnel, and a reflux condenser was used. To this vessel was added 8.0 grams of Lemol 22–88 (polyvinyl alcohol), 2.0 grams of Elvanol 50–42 (polyvinyl alcohol), 0.4 gram of a 75% solution of a sodium salt of a dioctyl ester of sulfosuccinic acid, 0.28 gram of sodium acetate, 0.48 gram of potassium persulfate and 321.8 grams of deionized water. Thereafter a previously prepared solution of 16.4 grams of lindane, 306.9 grams of vinyl acetate and 76.7 grams of dibutyl fumarate was added to the vessel. The vessel was then heated to reflux temperature using a water bath. After the refluxing had subsided, the reaction mixture was heated slowly to a temperature of 90° C. and held at that temperature for one half hour. The reaction mixture was then cooled to room temperature. The resulting polymer latex contained 55.4% solids and had a viscosity of 1240 cps. (Brookfield model LVF No. 3 spindle at 60 r.p.m.).

The polymer latex for the paint of Example 23 was made as described in Example 22, except that the 16.4

The following procedure was used in formulating the paints using the ingredients of Table X. The water of the formulation was added to a mixing vessel and thereafter the following ingredients were added with good mixing in the order stated: Daxad 30, Natrosol 250 H.R., ethylene glycol, hexylene glycol (if any), Colloid 606, and PMA–30. Thereafter the T. Pure R–901 and the Drikalite were added, and the resulting mixture stirred at high speed until the pigment slurry was completely dispersed and homogeneous. Thereafter, the speed of mixing was reduced and the polymer latex was added, followed by the Igepal CO–610. Stirring at reduced speed was continued until the paint formulation was uniformly mixed.

T. Pure R–901 was used as a white pigment and is reported to be a titanium dioxide pigment obtainable from E. I. du Pont de Nemours & Co., Inc. Drikalite was used as a white filler and is reported to be a calcium carbonate obtainable from Thompson, Weiman & Co. Daxad 30 was used as a dispersing agent and is reported to be a sodium salt of a polyelectrolyte obtainable from Dewey & Almy, Inc. Colloid 606 was used as a defoaming agent and is obtainable from Colloids, Inc. Troysan PMA–30 was used as a preservative and is reported to be a phenol mercuric acetate (30%) obtainable from Troy Chemical Co. Igepal CO–610 was used as a non-ionic surfactant and is reported to be a nonylphenoxy poly(ethyleneoxy)ethanol obtainable from the Antara Division of General Aniline & Film Corp. Natrosol 250 H.R. (3%) was used as a suspending agent and is reported to be a hydroxyethyl cellulose obtainable from Hercules Powder Co.

The foregoing paint formulation and mixing procedure are understood to be conventional in the art, except for the insecticide-containing polymer portion of the latex. Other paint formulations may be used if desired.

The paints of Examples 14–23 were applied to wooden panels and tested for effectiveness against roaches in the same manner as previously described in respect of Examples 9–13. The panels were tested a few days after they were painted, and the results are reported in Table XI, in which the abbreviation PVAc–DBF refers to polyvinyl acetate-dibutyl fumarate copolymer.

TABLE XI.—ROACH KILL RESULTS OF EXAMPLES 14-23

| Example No | 14 | 15 | 16 | 17 | 18 | 19 | 20 | 21 | 22 | 23 |
|---|---|---|---|---|---|---|---|---|---|---|
| Insecticide | None | Baytex | Diazinon | Dieldrin | Lindane | Lindane | Lindane | Dieldrin | Lindane | Lindane |
| Polymer Type | Acrylic | Acrylic | Acrylic | Acrylic | Acrylic | Styrene-Butadiene | PVAc-DBF | PVAc-DBF | PVAc-DBF | PVAc-DBF |
| Roaches Killed, Percent: | | | | | | | | | | |
| 24 hours | 0 | 0 | 40 | 30 | 40 | 30 | 30 | 0 | 0 | 20 |
| 30 hours | 0 | 10 | 65 | 35 | 75 | 55 | 35 | 30 | 45 | 55 |
| 48 hours | 0 | 35 | 90 | 60 | 80 | 70 | 60 | 45 | 75 | 75 |
| 54 hours | 0 | 45 | 95 | 65 | 85 | 80 | 65 | 55 | 75 | 75 |
| 72 hours | 0 | 80 | 100 | 70 | 85 | 85 | 65 | 60 | 85 | 85 |

The expression "latex polymer" as used herein has reference to synthetic polymeric material which is produced by the addition polymerization of one or more vinyl-type monomers by an emulsion polymerization procedure. The latex polymers are available to the formulators of water-based coating compositions as dispersions of the vinyl polymeric materials in the media employed in the polymerization procedures and such dispersions derived by such procedures are referred to herein as polymer latexes.

It should be understood that throughout the specification the amounts of the various materials are reported as parts by weight unless clearly understood by the context to be otherwise.

While only certain preferred embodiments of this invention have been shown and described by way of illustration, many modifications will occur to those skilled in the are and it is, therefore, desired that it be understood that it is intended in the appended claims to cover all such modifications as fall within the true spirit and scope of this invention.

Having thus described the invention, I claim:

1. A process for making an insecticide-containing polymer which comprises dissolving at least one organic insecticide in at least one polymerizable vinyl-type monomer, said monomer and any other vinyl-type monomer with which it is copolymerized providing the predominant monomeric units in the polymer, dispersing said monomer as droplets throughout a liquid aqueous polymerization medium in which said monomer is substantially immiscible and in which said insecticide is substantially insoluble, and polymerizing said monomer by emulsion polymerization techniques and obtaining a stable polymer latex containing discrete normally solid small particles of polymer having incorporated therein said insecticide.

2. The process of claim 1 wherein said insecticide comprises at least one member selected from the class consisting of 1,2,3,4,5,6-hexachlorocyclohexane, gamma isomer, 1,2,3,4,10,10-hexachloro-6,7-epoxy-1,4,5a,5,6,7,8,8a-octahydro-1,4,5,8-dimethanonaphthalene (endo-exo isomer), O,O'dimethyl-O"-[4-methylthio) - m - tolyl]phosphorothioate, and O,O'-diethyl-O"-[2-isopropyl-4-methyl-6-pyrimidinyl]phosphorothioate, as herein defined.

3. The process of claim 1 wherein said insecticide consists essentially of at least one member selected from the class enumerated in Table I hereof, which are 3-allyl-4-methyl-2-oxo-3-cyclopenten-1-yl ester of 2,2-dimethyl - 3 - (2 - methylpropenyl)cyclopropanecarboxylic acid;

O-isopropoxyphenyl methylcarbamate;

O,O'dimethyl-O" - [4 - methylthio-m-tolyl]phosphorothioate;

1,2,4,5,6,7,8,8 - octachloro - 4,7 - methane - 3a,4,7,7a-tetrahydroindane;

O,O' - diethyl - O" - [3 - chloro - 4 - methyl - 2 - oxo-2H-1-benzopyran-7-yl]phosphorothioate;

O,O' - diethyl - O" - [2 - isopropyl - 4 - methyl - 6-pyrimidinyl]phosphorothioate;

dimethyl-1,2-dibromo-2,2-dichloroethyl phosphate;

1,2,3,4,10,10-hexachloro-6,7 - epoxy - 1,4,5a,5,6,7,8,8a-octahydro - 1,4,5,8 - dimethanonaphthalene (endo-exo isomer);

O,O' - dimethyl - O" - [4 - (methylthio) - m - tolyl] phosphorothioate;

decachloro-octahydro - 1,3,4 - metheno - 2H - cyclobuta[cd]pentalene-2-one;

β-butoxy,β'-thiocyano-diethyl ether;

1,2,3,4,5,6-hexachlorocyclohexane, gamma isomer;

S - (1,2 - dicarbethoxyethyl) - O,O' - dimethyldithiophosphate;

1,1 - dichloro - α,α - bis(p-ethylphenyl)ethane; also called diethyl diphenyl dichloroethane;

terpene polychlorinates (66% Cl); and N,N-diethyl-m-toluamide.

4. The process of claim 1 wherein said particles contain at least one insecticide in an amount greater than the equilibrium solubility concentration of said insecticide when said insecticide is dissolved in a melted finshed polymer made from the same reactants and by the same polymerization technique but without having had any of said insecticide dissolved in said monomer during the polymerization thereof.

5. The process of claim 1 wherein said vinyl-type monomer is selected from the class consisting essentially of acrylic acids, alkanol esters of acrylic acids, lower alkenyl esters of lower carboxylic acids, lower alkyl esters of unsaturated carboxylic acids, alkenyl benzenes, dialkenyl benzenes, lower monoolefins, lower diolefins, and mixtures thereof.

6. A process of preparing an insecticide-containing polymer latex by emulsion polymerization which process comprises dispersing at least one water-immiscible vinyl-type monomeric material in an aqueous polymerization medium, said monomeric material having dissolved therein an organic insecticide which is substantially insoluble in water, and polymerizing said monomeric material by an aqueous emulsion polymerization technique to form discrete small normally solid particles of polymer having incorporated therein said insecticide and withdrawing a polymer latex product comprising said polymer particles dispersed in water.

7. The process of claim 6 wherein said insecticide and said monomeric material are added separately to said aqueous polymerization medium, and said insecticide is dissolved in said material and said material dispersed as small droplets throughout said medium by stirring.

8. An emulsified polymer latex made by an emulsion polymerization process which comprises dispersing at least one water-immiscible vinyl-type monomeric material in an aqueous polymerization medium, said monomeric material having dissolved therein an organic insecticide which is substantially insoluble in water, and polymerizing said monomeric material by an aqueous emulsion polymerization technique to form discrete small normally solid particles of polymer having incorporated therein said insecticide to obtain a polymer latex product comprising said polymer particles dispersed in water.

9. The emulsified latex product of claim 8 in which said insecticide was selected from the class consisting of 1,2,3,4,5,6 - hexachlorocyclohexane, gamma isomer, 1,2,3,4,10,10 - hexachloro - 6,7 - epoxy - 1,4,5a,5,6,7,8,8a-octahydro - 1,4,5,8 - dimethanonaphthalene (endo-exo isomer), O,O'-dimethyl-O" - [4 - methylthio) - m - tolyl] phosphorothioate, and O,O'-diethyl-O"-[2 - isopropyl - 4-methyl-6-pyrimidinyl]phosphorothioate, herein defined.

10. The emulsified latex product of claim 8 in which said vinyl-type monomers are selected from the class consisting essentially of acrylic acids, aryl and lower alkyl esters of acrylic acids, lower alkenyl esters of lower monocarboxylic acids, alkyl and aryl esters of unsaturated carboxylic acids, alkenyl benzenes, dialkenyl benzenes, lower monoolefins, lower diolefins, and mixtures thereof.

11. A water-based paint comprising an emulsified polymer latex, said latex having been made by an emulsion polymerization process which comprises dispersing at least one water-immiscible vinyl-type monomeric material in an aqueous polymerization medium, said monomer material having dissolved therein an organic insecticide which is substantially insoluble in water, and polymerizing said monomeric material by an aqueous emulsion polymerization technique to form discrete small normally solid particles of polymer having incorporated therein said insecticide to obtain a polymer latex product comprising said polymer particles dispersed in water.

12. A dry-bright floor polish composition comprising an emulsified polymer latex in which the only insecticide in said floor polish is incorporated in the particles of polymer thereof, said latex having been made by an emulsion polymerization process which comprises dispersing at least one water-immiscible vinyl-type monomeric material in an aqueous polymerization medium, said monomeric material having dissolved therein an organic insecticide which is substantially insoluble in water, and polymerizing said monomeric material by an aqueous emulsion polymerization technique to form discrete small normally solid particles of polymer having incorporated therein said insecticide to obtain a polymer latex product comprising said polymer particles dispersed in water.

References Cited
UNITED STATES PATENTS

| | | | |
|---|---|---|---|
| 3,228,830 | 1/1966 | McFadden et al. | 167—42 |
| 3,074,845 | 1/1963 | Geary | 167—42 |
| 3,175,898 | 3/1965 | Seymour et al. | 167—42 |

FOREIGN PATENTS

| | | |
|---|---|---|
| 592,670 | 9/1947 | Great Britain. |

MURRAY TILLMAN, *Primary Examiner.*

W. J. BRIGGS, Sr., *Assistant Examiner.*